United States Patent
Ishida et al.

(10) Patent No.: US 9,784,842 B2
(45) Date of Patent: Oct. 10, 2017

(54) SURVEYING INSTRUMENT

(71) Applicant: Kabushiki Kaisha TOPCON, Tokyo-to (JP)

(72) Inventors: Takeshi Ishida, Tokyo-to (JP); Nobuyuki Nishita, Tokyo-to (JP); Jumpei Kochi, Tokyo-to (JP); Goro Iwasaki, Tokyo-to (JP); Hiroyuki Nakabe, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 167 days.

(21) Appl. No.: 14/878,108

(22) Filed: Oct. 8, 2015

(65) Prior Publication Data

US 2016/0102977 A1    Apr. 14, 2016

(30) Foreign Application Priority Data

Oct. 8, 2014  (JP) .................................. 2014-207003

(51) Int. Cl.
*G01C 15/00* (2006.01)
*G01S 19/14* (2010.01)

(52) U.S. Cl.
CPC ............ *G01S 19/14* (2013.01); *G01C 15/008* (2013.01)

(58) Field of Classification Search
CPC .......... G01S 19/48; G01S 19/04; G01S 19/14; G01C 11/02; G01C 15/008; G01C 15/00; G01C 15/002; G01C 15/006; G01C 3/08; G01C 11/04; G01C 15/06
USPC .......................................... 33/290, 292, 299
See application file for complete search history.

(56) References Cited

U.S. PATENT DOCUMENTS

| | | | | |
|---|---|---|---|---|
| 9,182,229 B2* | 11/2015 | Grasser | .................. | G01C 15/00 |
| 9,618,340 B2* | 4/2017 | Ishida | .................... | G01C 17/34 |
| 2009/0267827 A1* | 10/2009 | Allison | .................. | G01C 15/00 |
| | | | | 342/357.27 |
| 2016/0010985 A1* | 1/2016 | Ishida | ...................... | G01C 1/04 |
| | | | | 356/139.01 |
| 2016/0010987 A1* | 1/2016 | Ishida | .................... | G01C 17/34 |
| | | | | 33/292 |
| 2016/0102977 A1* | 4/2016 | Ishida | ................. | G01C 15/008 |
| | | | | 33/292 |
| 2017/0067739 A1* | 3/2017 | Siercks | ................ | G01C 15/002 |

(Continued)

FOREIGN PATENT DOCUMENTS

JP    2007-327862 A    12/2007

*Primary Examiner* — Yaritza Guadalupe-McCall
(74) *Attorney, Agent, or Firm* — Nields, Lemack & Frame, LLC (57) ABSTRACT

The invention provides a surveying instrument, which comprises a control device having a reference clock signal generating unit for producing a reference clock signal. The control device produces a time signal to indicate a standard time from a signal acquired from the GNSS device, puts a time stamp on the time signal, associates the time signal with the reference clock signal, measures a horizontal angle at a moment when the telescope unit sights the sun and acquires an image signal, puts a time stamp on the image signal, calculates a standard time at a time of image acquisition, calculates an azimuth angle of the sun at the standard time based on a latitude and a longitude of a point where the surveying instrument is installed and a standard time at the time of image acquisition, and updates a horizontal angle by the azimuth angle.

6 Claims, 4 Drawing Sheets

(56) References Cited

U.S. PATENT DOCUMENTS

2017/0091922 A1* 3/2017 Siercks ................ G06T 7/0004
2017/0091923 A1* 3/2017 Siercks ................ G06T 7/0004

* cited by examiner

SURVEYING INSTRUMENT

BACKGROUND OF THE INVENTION

The present invention relates to a surveying instrument.

In a case where a surveying instrument is installed for performing a surveying operation, a true north is measured for setting a reference direction of the surveying instrument. As one of the methods to determine azimuth at a position of installation, there is a method that the true north is surveyed by utilizing the sun.

A position (i.e. latitude and longitude) where the surveying instrument is installed is already known, the sun is sighted by a telescope from a position or installation and a horizontal angle of the sun when the sighting is performed is obtained. Further, the true north can be surveyed by obtaining an azimuth angle of the sun based on the latitude, longitude and time moment when the sighting is performed and replacing (updating) the horizontal angle by the azimuth angle.

As a means to measure the true north, after the installation of the surveying instrument, the sun is sighted by a telescope as provided on the surveying instrument, and then, a vertical angle and a horizontal angle in the sighting direction are measured. For this reason, a time difference occurs between a moment when the sun is sighted and a moment when a directional angle is measured. The sun moves at a high speed (15 arcseconds/second at maximum) due to the rotation of the earth, and the horizontal angle as measured is deviated, at such an extent as obtained by the time difference multiplied by the speed of the sun, from the actual position of the sun.

For this reason, in a case where it is necessary to measure the true north with high accuracy, since the deviation of the position of the sun appear as an error, it has been desired that a true north surveying which does not include the deviation of the position of the sun in a measurement result can be performed with higher accuracy.

SUMMARY OF THE INVENTION

It is an object of the present invention to provide a surveying instrument, by which a true north surveying which does not include a deviation of a position of the sun in a measurement result can be performed with higher accuracy.

To attain the object as described above, a surveying instrument according to the present invention comprises a GNSS device, a frame unit rotatable an a horizontal direction, a telescope unit as mounted rotatably in a vertical direction on the frame unit, an image acquiring unit installed on the telescope unit, a driving unit for rotating and driving the frame unit and the telescope unit, a horizontal angle measuring unit for detecting a horizontal angle of the frame unit, a vertical angle measuring unit for detecting a vertical angle of the telescope unit, and a control device having a reference clock signal generating unit for producing a reference clock signal, wherein the control device produces a time signal to indicate a standard time from a signal acquired from the GNSS device, puts a time stamp on the time signal based on the reference clock signal, associates the time signal with the reference clock signal, measures a horizontal angle by the horizontal angle measuring unit at a moment when the telescope unit sights the sun and acquires an image signal by the image acquiring unit, puts a time stamp on the image signal based on the reference clock signal, calculates a standard time at a time of image acquisition based on a time stamp of the image signal and the reference clock signal, calculates an azimuth angle of the sun at the standard time based on a latitude and a longitude of a point where the surveying instrument is installed and a standard time at the time of image acquisition, and updates a horizontal angle as measured by the horizontal angle measuring unit by the azimuth angle.

Further, in the surveying instrument according to the present invention, the telescope unit is stopped at a time of completion of sighting, the control device calculates a positional deviation between an image of the sun in an image as acquired and a sighting position, calculates a horizontal deviation angle of an optical axis of the telescope unit based on the positional deviation, and corrects the azimuth angle to be updated by the horizontal deviation angle.

Further, in the surveying instrument according to the present invention, the surveying instrument has a tracking function, the control device acquires an image by the image acquiring unit and measures a horizontal angle a plurality of times by the horizontal angle measuring unit under a condition where a tracking operation is continued, puts on a time stamp with respect to an image signal and each horizontal angle measuring signal and calculates the standard time at the time of image acquisition from the time stamp of the reference clock signal and the image signal, calculates an azimuth angle of the sun at the standard time, calculates a horizontal angle at the time of image acquisition based on the time stamp of each horizontal angle measuring signal, a horizontal angle corresponding to each time stamp, a time stamp of the image signal, and the reference clock signal, and updates the horizontal angle at the time of image acquisition by the azimuth angle of the sun at the standard time.

Further, in the surveying instrument according to the present invention, the control device calculates a positional deviation between an image of the sun in an image as acquired and a sighting position, calculates a horizontal deviation angle of an optical axis of the telescope unit based on the positional deviation, and corrects the azimuth angle to be updated based on the horizontal deviation angle.

Further, in the surveying instrument according to the present invention, the control device measures a horizontal angle at a time of updating the horizontal angle by the horizontal angle measuring unit, obtains a deviation between the horizontal angle as measured and the horizontal angle at the time of image acquisition, and corrects the azimuth angle based on the deviation.

According to the present invention, the surveying instrument comprises a GNSS device, a frame unit rotatable in a horizontal direction, a telescope unit as mounted rotatably in a vertical direction on the frame unit, an image acquiring unit installed on the telescope unit, a driving unit for rotating and driving the frame unit and the telescope unit, a horizontal angle measuring unit for detecting a horizontal angle of the frame unit, a vertical angle measuring unit for detecting a vertical angle of the telescope unit, and a control device having a reference clock signal generating unit for producing a reference clock signal, wherein the control device produces a time signal to indicate a standard time from a signal acquired from the GNSS device, puts a time stamp on the time signal based on the reference clock signal, associates the time signal with the reference clock signal, measures a horizontal angle by the horizontal angle measuring unit at a moment when the telescope unit sights the sun and acquires an image signal by the image acquiring unit, puts a time stamp on the image signal based on the reference clock signal, calculates a standard time at a time of image acquisition based on a time stamp of the image signal and the reference clock signal, calculates an azimuth angle of the sun at the standard time based on a latitude and a longitude of a point where the surveying instrument is installed and a standard time at the time of image acquisition, and updates a horizontal angle as measured by the horizontal angle measuring unit by the azimuth angle. As a result, even in a case where time has elapsed from a completion of sighting to the time of image acquisition, it is possible to obtain an accurate standard time of the time of image acquisition and it is possible to measure an accurate azimuth angle at the time of image acquisition.

Further, according to the present invention, in the surveying instrument, the telescope unit is stopped at a time of completion of sighting, the control device calculates a positional deviation between an image of the sun in an image as acquired and a sighting position, calculates a horizontal deviation angle of an optical axis of the telescope unit based on the positional deviation, and corrects the azimuth angle to be updated by the horizontal deviation angle. As a result, even in a case where time is elapsed from the completion of sighting and the sun has moved, an accurate true north surveying can be performed.

Further, according to the present invention, in the surveying instrument, the surveying instrument has a tracking function, the control device acquires an image by the image acquiring unit and measures a horizontal angle a plurality of times by the horizontal angle measuring unit under a condition where a tracking operation is continued, puts on a time stamp with respect to an image signal and each horizontal angle measuring signal and calculates de standard time at the time of image acquisition from the time stamp of the reference clock signal and the image signal, calculates an azimuth angle of the sun at the standard time, calculates a horizontal angle at the time of image acquisition based on the time stamp of each horizontal angle measuring signal, a horizontal angle corresponding to each time stamp, a time stamp of the image signal, and the reference clock signal, and updates the horizontal angle at the time of image acquisition by the azimuth angle of the sun at the standard time. As a result, even under a tracking condition, it is possible to measure an accurate azimuth angle and horizontal angle at the time of the image acquisition and an accurate true north surveying can be performed.

Further, according to the present invention, in the surveying instrument, the control device calculates a positional deviation between an image of the sun in an image as acquired and a sighting position, calculates a horizontal deviation angle of an optical axis of the telescope unit based on the positional deviation, and corrects the azimuth angle to be updated based on the horizontal deviation angle. As a result, even in a case where an optical axis and the image of the sun are not completely coincident with each other in the image, it is possible to perform an accurate true north surveying.

Furthermore, according to the present invention, in the surveying instrument, the control device measures a horizontal angle at a time of updating the horizontal angle by the horizontal angle measuring unit, obtains a deviation between the horizontal angle as measured and the horizontal angle at the time of image acquisition, and corrects the azimuth angle based on the deviation. As a result, even when a change of the horizontal angle of the optical axis of the telescope unit is not negligible in the measurement according to tracking, it is possible to perform an accurate true north surveying.

DETAILED DESCRIPTION OF THE PREFERRED EMBODIMENT

A description will be given below on an embodiment of the present invention by referring to the attached drawings.

Figure 1:
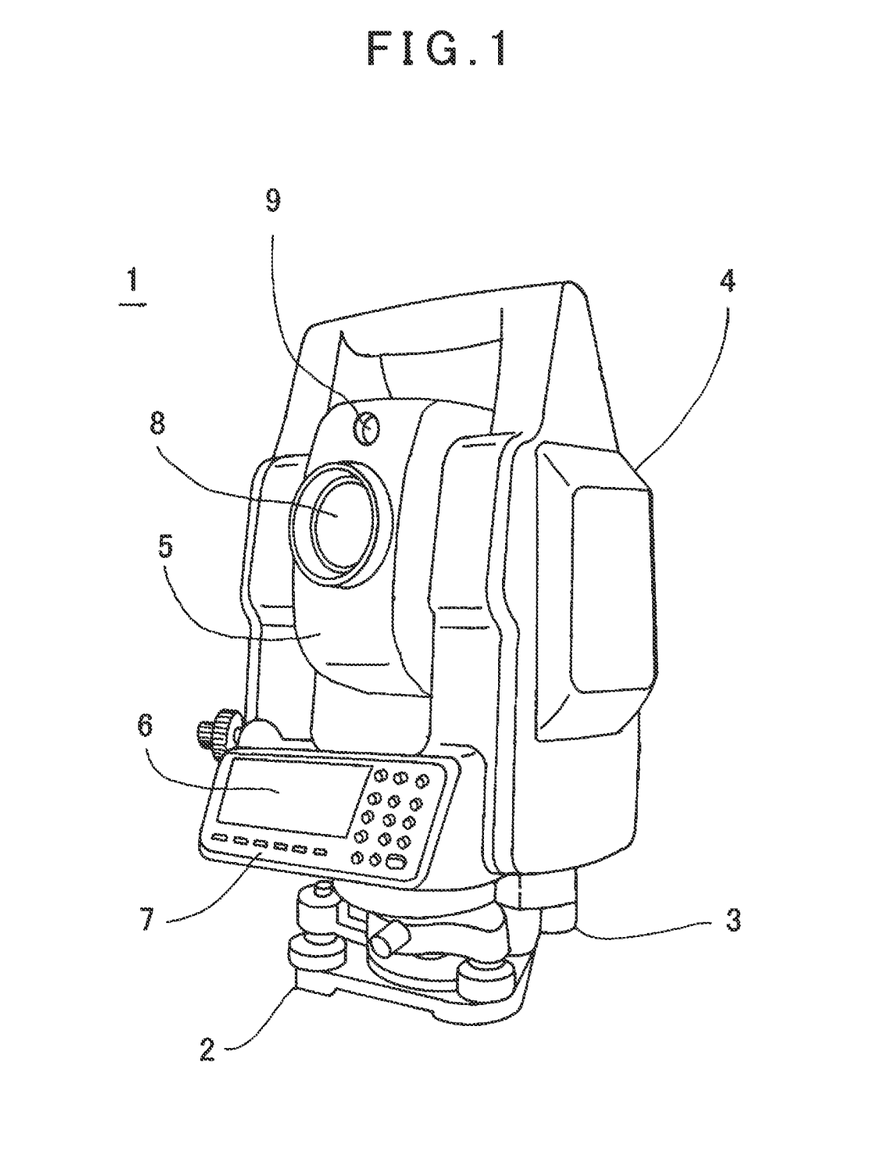
FIG. 1 is a schematical external view of a surveying instrument according to an embodiment of the present invention.
Figure 2:
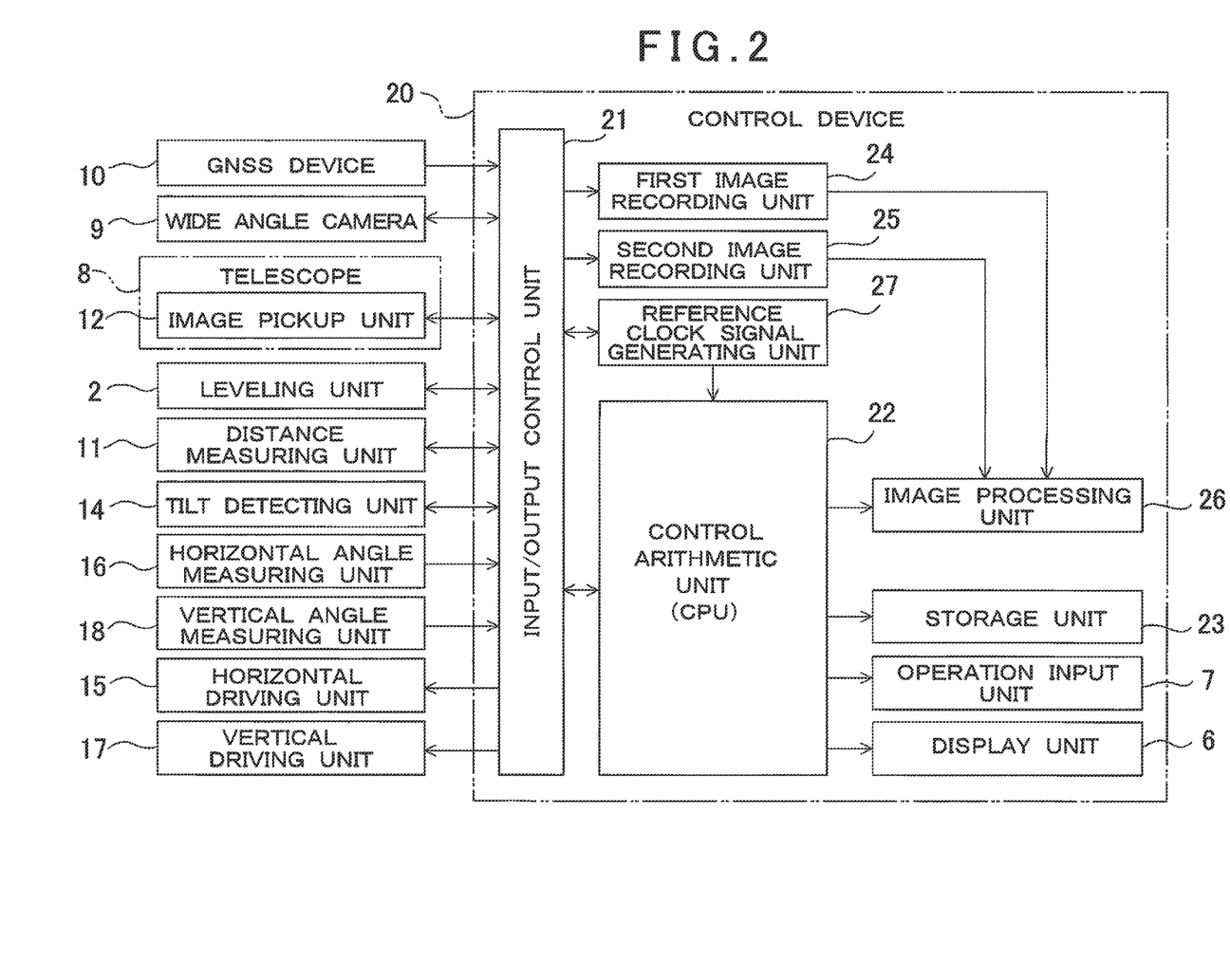
FIG. 2 is a block diagram to show an approximate arrangement of the surveying instrument.

FIG. 1 and FIG. 2 shows a surveying instrument 1, to which the present invention is applied. It is to be noted that the surveying instrument 1 as used is a total station, for instance, and has a tracking function. A pulsed laser beam is projected towards a measuring point as a distance measuring light, a reflected light (hereinafter referred as "a reflection light") of the distance measuring light from the measuring point is received, and a distance is measured for each pulse of the light. By taking an average value of the results of distance measurement, the measurement of distance is performed with high precision.

As shown in FIG. 1, the surveying instrument 1 primarily comprises a leveling unit 2 mounted on a tripod (not shown), a base unit 3 mounted on the leveling unit 2, a frame unit 4 rotatably mounted around a vertical axis as a center on the base unit 3, a telescope unit 5 rotatably mounted around a horizontal axis as a center on the frame unit 4, and an image acquiring unit (to be described later) as provided on the telescope unit 5.

The frame unit 4 comprises a display unit 6 and an operation input unit 7. The telescope unit 5 has a telescope 8 for sighting an object to be measured and a distance measuring unit 11, which commonly shares an optical system of the telescope 8. Further, the telescope unit 5 has an image pickup unit 12 for acquiring an image in a sighting direction through the optical system of the telescope 8. Also, the telescope unit 5 comprises a wide angle camera 9. The wide angle camera 9 has an optical axis running in parallel to an optical axis of the telescope 8, and can acquire a wide angle image in the sighting direction or in an approximately sighting direction of the telescope 8. A distance between the optical axis of the telescope unit 5 and the optical axis of the wide angle camera is already known. The image acquiring unit is constituted of the wide angle camera 9 and the image pickup unit 12 or is constituted of either one of the wide angle camera 9 or the image pickup unit 12.

Further, the surveying instrument 1 has a GNSS (Global Navigation Satellite System) device 10. The GNSS device 10 receives satellite signals issued from satellites and measures a position (absolute coordinates) of the surveying instrument 1, and issues a GNSS time signal from a time signal included in the satellite signal.

A field angle of the telescope 8 is 1°, for instance, and a field angle of the wide angle camera 9 is 15° to 30°, for instance. Further, although the optical axis of the telescope 8 is different from the optical axis of the wide angle camera 9, a distance between these optical axes is already known, and a deviation of the sighting direction between the wide angle camera 9 and the telescope 8 can be corrected by calculation.

Each of the wide angle camera 9 and the image pickup unit 12 outputs a picked up image as a digital image signal respectively. A photodetection element of each of the wide angle camera 9 and the image pickup camera 12 is a CCD, a CMOS, etc., for instance, which is an aggregate of pixels and so arranged that a position of the pixel to be received can be specified and that a field angle with respect to the respective optical axis can be detected from the position of the pixel to be received.

Referring to FIG. 2, description will be given on a basic arrangement of the surveying instrument 1.

As described above, the telescope unit 5 houses the distance measuring unit 11, which commonly shares an optical system of the telescope 8. The distance measuring unit 11 emits a pulsed laser beam as a distance measuring light through the optical system and receives a reflection light from an object to be measured through the optical system, and an electro-optical distance measurement is performed on a distance to the object to be measured based on the reflection light as received.

In a case where the object to be measured is a prism, the distance measuring unit 11 can perform measurement in a prism measurement mode. Further, in a case where the object to be measured is not a prism, the distance measuring unit 11 can perform measurement in a non-prism measurement mode. And a measurement mode can be switched over corresponding to the object to be measured.

On the frame unit 4, a horizontal driving unit 15 for rotating the frame unit 4 in a horizontal direction is provided, and a horizontal angle measuring unit 16 for detecting a horizontal rotation angle and for detecting a horizontal angle of a sighting direction is provided with respect to the base unit 3 of the frame unit 4. Further, on the frame unit 4, a vertical driving unit 17 is provided, which rotates around the telescope unit 5 with a horizontal axis as a center and a vertical angle measuring unit 18 is provided, which detects a vertical angle of the telescope unit 5 in the sighting direction.

Further, on the frame unit 4, a tilt detecting unit 14 is provided and the tilt detecting unit 14 detects a tilt or a horizontally of the frame unit 4.

A control device 20 is housed in the frame unit 4. Based on a detection result of the tilt detecting unit 14, the control device 20 controls the leveling unit 2 and levels the frame unit 4 in a horizontal direction.

Further, the control device 20 controls the driving of the horizontal driving unit 15 and rotates the frame unit 4 in a horizontal direction, and further, controls the driving of the vertical driving unit 17 and rotates the telescope unit 5 in an elevation direction. The horizontal rotation of the frame unit 4 is detected by the horizontal angle measuring unit 16 and the horizontal angle as detected is inputted to the control device 20. The vertical rotation of the telescope unit 5 is detected by the vertical angle measuring unit 18 and the vertical angle as detected is inputted to the control device 20.

Based on the detection results from the horizontal angle measuring unit 16 and the detection results from the vertical angle measuring unit 18 and by cooperative movement of the horizontal driving unit 15 and the vertical driving unit 17, the control device 20 directs the telescope unit 5 in a predetermined direction.

Referring to FIG. 2, further description will be given on the control device 20.

The control device 20 is constituted of an input/output control unit 21, a control arithmetic unit 22, a storage unit 23, a first image recording unit 24 for recording images acquired by the wide angle camera 9, a second image recording unit 25 for recording image acquired by the image pickup unit 12, an image processing unit 26 for performing image processing such as a specifying of a measuring point or an object to be measured based on the image acquired by the wide angle camera 9 and the image acquired by the image pickup unit 12, a reference clock signal generating unit 27 for generating a reference clock signal, the display unit 6, the operation input unit 7, and the like.

The control device 20 acquire images by the wide angle camera 9 by executing various types of programs (to be described later) as stored in the storage unit 23, performs detecting and tracking of the sun, and further executes the true north surveying based on the images acquired by the wide angle camera 9, and controls the tracking of the object to be measured based on the image acquired by the image pickup unit 12. Further, based on the image acquired by the wide angle camera 9 and the image acquired by the image pickup unit 12, the control device 20 performs a searching in order to capture the object to be measured in the images (in a field of view of the telescope) before starting the tracking, or performs searching to capture the object to be measured in the image again in a case where the object to be measured deviated from the image during the tracking operation.

In the storage unit 23, various types of programs are stored. These programs include: a sequence program for executing the measurement, an image display program for displaying on the display unit 6, a calculation program for executing calculations necessary for the measurement, an image processing program for performing image processing on the images acquired by the wide angle camera 9 and the image pickup unit 12, a true north surveying program for sighting the sun from the images as processed, calculating a position of the sun at the time of sighting and executing the true north surveying, a correction program for correcting errors based on a time difference in a case where time difference occurs between the time of sighting, time of image acquisition and the time of horizontal angle measurement, a distance measuring program for measuring a distance to the measuring point and for measuring the distance by tracking the object to be measured, and other programs.

The measurement results are inputted to the control arithmetic unit 22 from the distance measuring unit 11, the horizontal angle measuring unit 16 and the vertical angle measuring unit 18. According to the sequence program, the arithmetic operation program, the distance measuring program, etc., the control arithmetic unit 22 executes the distance measurement, the measurement of the vertical angle and the horizontal angle, and the correction of measurement errors, and it is so arranged that the measurement results are stored in the storage unit 23 by the image display program or the like and displayed on the display unit 6.

The image processing program makes the image processing unit 26 to execute an image processing such as an extraction of the measuring point or the object to be measured based on the image acquired by the wide angle camera 9 and the image acquired by the image pickup unit 12.

Further, the control arithmetic unit 22 can execute a normal surveying mode which execute a distance measurement and an angle measurement of the object to be measured according to the distance measuring program and a true north surveying mode to perform the true north surveying according to the true north surveying program. By selecting a surveying mode from the operation input unit 7, a measurement as required can be executed.

A description will be given below on a case where surveying is performed.

First, in a case where an object to be measured existing in a horizontal direction is measured by the surveying instrument 1, the normal surveying mode is selected, and a distance to the object to be measured is measured by sighting the object to be measured by the telescope 8.

Next, in a case where the true north surveying is to be executed, the surveying instrument 1 is installed at a known point, i.e. a point where a latitude and a longitude are already known, and leveled by the leveling unit 2. Information (latitude and longitude) of the position as installed are acquired by the GNSS device 10 and inputted to the control device 20. Or, a surveying operator may input the latitude and the longitude of the position as installed to the control device 20 by the operation input unit 7.

Further, in a case where the true north surveying is executed, there are a true north surveying performed by an operator and a true north surveying performed automatically.

In a case of the true north surveying performed by the operator, a light attenuation filter is mounted on the telescope 8 and the wide angle camera 9, and the surveying operator sights the sun by the telescope 8. A vertical angle and a horizontal angle of the telescope 8 at the time of sighting are measured by the horizontal angle measuring unit 16 and the vertical angle measuring unit 18 respectively, and measurement results are inputted to the control device 20. Further, a time signal regarding the standard time is included in the GNSS signal received by the GNSS device 10. The control device 20 obtains the standard time at a time of measurement by the GNSS device 10, calculates an azimuth angle (horizontal angle) of the sun based on this time, the latitude and the longitude and the horizontal angle and the vertical angle. The horizontal angle as calculated is detected by the horizontal angle measuring unit 16 thus calculated. By regarding (updating) this as the horizontal angle, the true north can be measured.

According to the present embodiment. The true north surveying can be performed automatically as described below.

The true north surveying mode is selected and a light attenuation filter is mounted on the telescope 8 and the wide angle camera 9.

First, a first method is described regarding the true north surveying.

At first, the sun is sighted. The sighting of the sun may be executed by visual inspection by the surveying operator, or, may be executed by using the tracking function of the surveying instrument 1.

In a case where a sighting of the sun is performed by the tracking function, the sighting is performed based on an image on which the sun is captured. In this case, the image may be an image acquired by the image pickup unit 12 installed on the telescope 8, or may be an image acquired by the wide angle camera 9. A description will be given below on a case where the sighting is performed by using the wide angle camera 9.

The surveying operator directs the wide angle camera 9 to an approximate direction of the sun so as to capture the sun by the wide angle camera 9. Since the field of view of the wide angle camera 9 is wide, the sun can be captured by the wide angle camera 9 if the direction is approximately correct. By the operation input unit 7, an instruction to perform the true north surveying automatically is inputted.

The surveying instrument 1 sights the sun so that an optical axis of the wide angle camera 9 coincides with the sun based on the image acquired by the wide angle camera 9.

Figure 3:
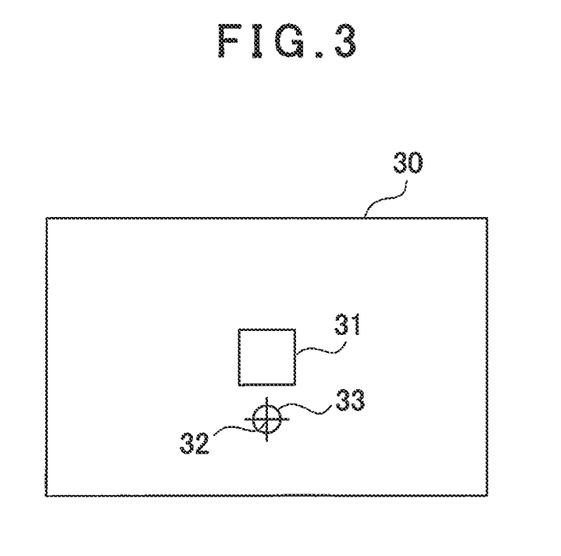
FIG. 3 is an explanatory drawing to show a relationship between a field of view of a telescope on a photodetection element of a wide angle camera and a sun sighting position in the present embodiment.

In a case where the true north surveying mode is selected, the sun sighting position 32 where the sun is to be sighted by the wide angle camera 9 is set deviated from the sighting position of the telescope 8 (the optical axis of the telescope 8). Further, as shown in FIG. 3, a relation between the sun sighting position 32 of the wide angle camera 9 and the sighting position of the telescope 8 is completely deviated from a field of view 31 of the telescope 8. Further, a deviation amount of the sun sighting position 32 from the sighting position of the telescope 8 is already known, and the amount is at least an amount, which is deviated from the field of view 31 of the telescope 8. Since the deviation amount between the sun sighting position 32 and the sighting position of the telescope 8 is already known, the sun sighting position 32 can be corrected so as to coincide with the sighting position of the telescope 8 by calculation.

FIG. 3 shows an image 30 of the wide angle camera 9, and shows a condition where the sun is finally sighted by the wide angle camera 9. In FIG. 3, an image 33 of the sun coincides with the sun sighting position 32. The sun sighting position 32 may be deviated in either direction with respect to the sighting position of the telescope 8, but since an accuracy of the horizontal angle is important in the true north measurement, the sun sighting position 32 is deviated in a vertical direction so that a calibration error of the horizontal angle is decreased.

Further, in the true north surveying mode, it is so arranged that an image taken by the wide angle camera 9 is displayed on the display unit 6 and it can be easily confirmed by an image of the display unit 6 whether or not the sun is captured by the wide angle camera 9.

The image 33 of the sun is tracked so as to coincide with the sun sighting position 32, and when the image 33 of the sun coincides with the sun sighting position 32, the sighting is regarded to be completed, the tracking is terminated, and the telescope unit 5 is stopped.

When the telescope unit 5 is stopped, a horizontal angle θ of the telescope unit 5 (a horizontal angle of an optical axis of the telescope 8) is measured by the horizontal angle measuring unit 16.

Under a condition where the telescope 5 is stopped, an image is acquired by the wide angle camera 9, and further, a time stamp is put on at a time of image acquisition, and an accurate time of image acquisition is obtained via the time stamp (to be described later).

There is a possibility that a deviation of time may occur between the time when the sighting of the sun is completed and the acquisition time of the image. In a case where there is deviation of time, the sun is moved by an amount of deviation of time. Further, by the movement of the sun, a deviation occurs between the horizontal angle as measured at the time of sighting and the horizontal angle of the sun at the time of image acquisition. The deviation between both the horizontal angles appears as a horizontal component of deviation between the position of the image 33 of the sun and the position of the optical axis on the image.

Regarding the time stamp which is put on an image signal at the time of image acquisition, an image pickup command signal (a shutter trigger signal) is issued to the wide angle camera 9 from the control arithmetic unit 22 and an image is acquired by the wide angle camera 9. Therefore, the time when the shutter trigger signal is issued is considered as the image acquisition time, and a time stamp is put on the image signal by a reference clock signal issued from the reference clock signal generating unit 27. The image signal where the time stamp is put on is stored in the storage unit 23.

As to be described later, a standard time at the image acquisition is obtained based on this time stamp. Further, according to this standard time and the latitude and the longitude of a point where the surveying instrument 1 is installed, an azimuth angle (horizontal angle) S of the sun at image acquisition is calculated. In a case where it is supposed that the sun does not move, or in a case where a processing time is short and the movement of the sun does not exert influence on the measurement, by substituting (updating) the horizontal angle as detected by the horizontal angle measuring unit 16 at a time of sighting, to S, it is possible to consider the horizontal angle as detected by the horizontal angle measuring unit 16 to be equivalent to the azimuth angle.

However, as described above, the sun moves at a high speed so under a measurement condition where the movement of the sun is not negligible or in a case where high accuracy is required, a deviation between the position of the sun and the sighting position is obtained on the image and the deviation caused by the movement of the sun is corrected.

The image processing unit 26 extracts the image 33 of the sun by processing an image stored in the first image recording unit 24 and detects the central position of the image 33 of the sun. The image processing unit 26 compares a central position of the image 33 of the sun with the sun sighting position 32, calculates the deviation amount between the central position of the image 33 of the sun and the sun sighting position 32 and a deviation direction. Further, the image processing unit 26 calculates a horizontal component of the deviation, and inputs the calculation result to the control arithmetic unit 22.

The control arithmetic unit 22 calculates a deviation angle $\Delta\theta$ of a horizontal angle based on a deviation $\delta$ on the image.

By taking this deviation angle $\Delta\theta$ into consideration and by updating the horizontal angle $\theta$ as measured by the horizontal, angle measuring unit 16 by $(S-\Delta\theta)$, the true north surveying is completed, and it is possible to consider the horizontal angle as measured by the horizontal angle measuring unit 16 as the azimuth angle.

It is to be noted that it may be arranged in such a manner that the image is acquired a plurality of times, and the time stamp is put on the image signal per each image acquisition, the deviation angle $\Delta\theta$ is obtained per each of the images, and an average value may be obtained.

As described above, by putting on a time stamp respectively with respect to the signals as obtained, it is possible to arrange the signals in time series.

Figures 4A, 4B:
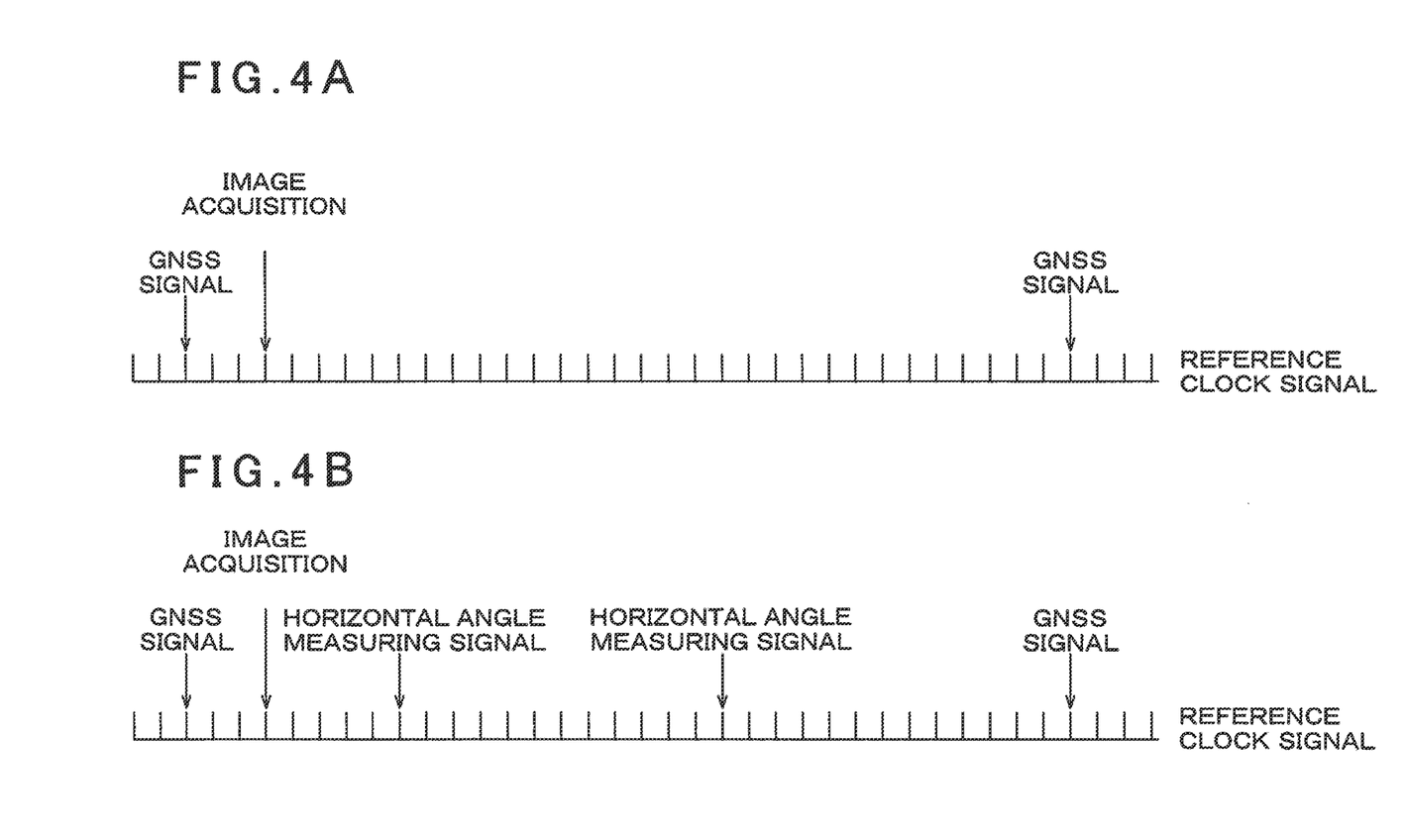
FIG. 4A and FIG. 4B are explanatory drawings to show a condition where it is so arranged that a reference clock signal is a time axis and signals acquired along the time axis is positioned and arranged.

FIG. 4 is a schematical drawing where a reference clock is arranged in time series. By regarding a clock signal column as a time axis, a GNSS signal and an image acquisition time are indicated on the time axis based on the time stamp.

From the reference clock signal generating unit 27, a reference clock signal is issued and a time stamp is put on each type of signals based on the reference clock signal.

Since a satellite signal is issued from the satellite at a rate of one signal/second, a GNSS signal can be obtained per each second. Further, a signal of the standard time is included in the satellite signal, the GNSS device 10 generates a time signal (hereinafter referred as a "GNSS time signal") to indicate the standard time based on the satellite signal and the GNSS time signal is outputted. A time stamp is put on each of the GNSS time signals based on the reference clock signal, and the GNSS time signal and the reference clock signal are associated with each other in terms of time.

By associating the GNSS time signal with the reference clock signal in terms of time, a reference clock signal column generated by the reference clock signal becomes a time axis of the standard time. Further, a data, where the GNSS time signal and the reference clock signal are associated with each other, are stored in the storage unit 23 via the input/output control unit 21 and the control arithmetic unit 22.

Based on an image acquiring position on the time axis and the GNSS time signal and the reference clock signal, a standard time of the image acquisition can be calculated. By this standard time and the latitude and the longitude of the point where the surveying instrument 1 is installed, an azimuth angle (horizontal angle) S of the sun at the time of image acquisition can be calculated.

Next, description will be given on a second method regarding a true north surveying. In the second method, the true north is measured while executing a tracking.

The surveying instrument 1 is made to sight the sun and the tracking is continued. Under a condition where the tracking is carried out, an image acquisition and a horizontal angle is measured by the horizontal angle measuring unit 16.

Based on the GNSS signal, the GNSS time signals are obtained sequentially, and a time stamp is put on per each GNSS time signals. Further, a time stamp is put on an image signal at the time of image acquisition. Horizontal angles are measured by two or more times, and the time stamp is put on the angle measuring signal each time the measurement is made.

FIG. 4B shows a GNSS time signal, an image acquisition signal and a horizontal angle measuring signal on a time axis based on the time stamp, where the reference clock signal column is used as the time axis. Further, from the time stamp and the reference clock signal column (the time axis of a standard time), a standard time at the time of image acquisition and a standard time at the time of a horizontal angle measurement can be obtained respectively.

In a manner similar to the first method, the standard time at the time of image acquisition can be obtained based on the time stamp of the GNSS time signal and the time stamp of the image acquisition signal. Further, based on the standard time, the latitude and the longitude at the time of image acquisition, an azimuth angle (horizontal angle) S of the sun is calculated.

Based on the relation between a plurality of horizontal angle measuring times and the image acquisition times, and further, from a value of the horizontal angle as measured at each measuring time, a horizontal angle $\theta$ of the telescope 8 at the time of image acquisition can be obtained by interpolation.

Further, the telescope 8 performs tracking based on the image, and the position of the sun on the image does not necessarily coincide with the sun sighting position 32. Positional deviation of the image 33 of the sun with respect to the sun sighting position 32 on the image, is obtained.

A positional deviation $\delta$ of the image 33 of the sun on the image is obtained from the image and a deviation $\Delta\theta$ of the horizontal angle is calculated from the positional deviation $\delta$ on the image.

Further, a horizontal angle $\theta'$ of the telescope unit 5 at a time of updating is measured by the horizontal angle measuring unit 16, and a deviation $(\theta-\theta')$ from the horizontal angle $\theta$ of the telescope unit 5 at the time of angle image acquisition is obtained. By taking this $(\theta-\theta')$ and the deviation Δθ of the horizontal angle into consideration, the azimuth angle at the time of updating is obtained as (S−Δθ+(θ'−θ)), and an angle to be detected by the horizontal angle measuring unit. 16 is updated by (S−Δθ+(θ'−θ)).

Therefore, true north surveying can be performed while executing the tracking. Further, the true north surveying may be performed a required number of times while executing the tracking, and the results of measurements may be averaged.

Further, an image processing is accompanied for a calculation of the tracking and the deviation δ on the image, while a processing as given below may be performed regarding the image processing.

On a photodetection element of the wide angle camera 9, a range corresponding to the field of view 31 of the telescope 8 is set as a photodetection prohibiting zone.

The control arithmetic unit 22 calculates a route to move the central position of the image 33 of the sun to the sun sighting position 32 from the central position of the sun and the sun sighting position 32.

Further, in a case where the central position of the sun on the photodetection element is coincided with the sun sighting position 32 and in a case where the central position of the image 33 of the sun passes through the field of view 31 of the telescope 8 when moved by the shortest distance, the control arithmetic unit 22 calculates a route so as to reach the sighting position 32 of the sun by avoiding the field of view 31 of the telescope 8, and performs driving and controlling on the horizontal driving unit 15 and the vertical angle measuring unit 18 based on the calculated route.

Or, an arbitrary shutter such as an electrical, a mechanical, etc. may be provided in an optical system of the telescope 8, and it may be so arranged that an optical path of the telescope 8 is intercepted in the true north surveying mode of the wide angle camera 9.

In the present embodiment, in a case where the true north surveying is performed, the true north surveying can be performed automatically after simply directing the wide angle camera 9 approximately toward the sun. Further, the processing condition of the true north surveying and the result of the true north surveying can be confirmed by the display unit 6, and this contributes to the promotion of higher working efficiency.

It is to be noted that in the description as given above, the true north surveying is performed based on the image acquired by the wide angle camera 9, while it is needless to say that the true north surveying may be performed based on the image acquired by the image pickup unit 12 via the telescope 8.

The invention claimed is:

1. A surveying instrument, comprising a GNSS device, a frame unit rotatable in a horizontal direction, a telescope unit as mounted rotatably in a vertical direction on said frame unit, an image acquiring unit installed on said telescope unit, a driving unit for rotating and driving said frame unit and said telescope unit, a horizontal angle measuring unit for detecting a horizontal angle of said frame unit, a vertical angle measuring unit for detecting a vertical angle of said telescope unit, and a control device having a reference clock signal generating unit for producing a reference clock signal, wherein said control device produces a time signal to indicate a standard time from a signal acquired from said GNSS device, puts a time stamp on said time signal based on said reference clock signal, associates said time signal with said reference clock signal, measures a horizontal angle by said horizontal angle measuring unit at a moment when said telescope unit sights the sun and acquires an image signal by said image acquiring unit, puts a time stamp on said image signal based on said reference clock signal, calculates a standard time at a time of image acquisition based on a time stamp of said image signal and said reference clock signal, calculates an azimuth angle of the sun at said standard time based on a latitude and a longitude of a point where said surveying instrument is installed and a standard time at the time of image acquisition, and updates a horizontal angle as measured by said horizontal angle measuring unit by said azimuth angle.

2. A surveying instrument according to claim 1, wherein said telescope unit is stopped at a time of completion of sighting, said control device calculates a positional deviation between an image of the sun in an image as acquired and a sighting position, calculates a horizontal deviation angle of an optical axis of said telescope unit based on said positional deviation, and corrects said azimuth angle to be updated by said horizontal deviation angle.

3. A surveying instrument according to claim 1, wherein said surveying instrument has a tracking function, said control device acquires an image by said image acquiring unit and measures a horizontal angle a plurality of times by said horizontal angle measuring unit under a condition where a tracking operation is continued, puts on a time stamp with respect to an image signal and each horizontal angle measuring signal and calculates the standard time at the time of image acquisition from the time stamp of said reference clock signal and said image signal, calculates an azimuth angle of the sun at the standard time, calculates a horizontal angle at the time of image acquisition based on the time stamp of each horizontal angle measuring signal, a horizontal angle corresponding to each time stamp, a time stamp of said image signal, and said reference clock signal, and updates the horizontal angle at the time of image acquisition by the azimuth angle of the sun at said standard time.

4. A surveying instrument according to claim 3, wherein said control device calculates a positional deviation between an image of the sun in an image as acquired and a sighting position, calculates a horizontal deviation angle of an optical axis of said telescope unit based on said positional deviation, and corrects said azimuth angle to be updated based on said horizontal deviation angle.

5. A surveying instrument according to claim 3, wherein said control device measures a horizontal angle at a time of updating the horizontal angle by said horizontal angle measuring unit, obtains a deviation between the horizontal angle as measured and the horizontal angle at the time of image acquisition, and corrects said azimuth angle based on said deviation.

6. A surveying instrument according to claim 4, wherein said control device measures a horizontal angle at a time of updating the horizontal angle by said horizontal angle measuring unit, obtains a deviation between the horizontal angle as measured and the horizontal angle at the time of image acquisition, and corrects said azimuth angle based on said deviation.

* * * * *